United States Patent
Trossen et al.

(10) Patent No.: US 8,046,476 B2
(45) Date of Patent: Oct. 25, 2011

(54) ACCESS RIGHT CONTROL USING ACCESS CONTROL ALERTS

(75) Inventors: Dirk Trossen, Cambridge, MA (US); Kuleen Mehta, Atlanta, GA (US)

(73) Assignee: Nokia Corporation, Espoo (FI)

(*) Notice: Subject to any disclaimer, the term of this patent is extended or adjusted under 35 U.S.C. 154(b) by 887 days.

(21) Appl. No.: 10/353,014

(22) Filed: Jan. 29, 2003

(65) Prior Publication Data
US 2004/0153552 A1    Aug. 5, 2004

(51) Int. Cl.
*G06F 15/16* (2006.01)
*G06F 15/167* (2006.01)

(52) U.S. Cl. ......... 709/229; 709/204; 709/216; 709/217

(58) Field of Classification Search .......... 709/201–207, 709/216–219, 229
See application file for complete search history.

(56) References Cited

U.S. PATENT DOCUMENTS

| | | | |
|---|---|---|---|
| 5,941,947 A * | 8/1999 | Brown et al. ................. | 709/225 |
| 6,658,095 B1 * | 12/2003 | Yoakum et al. ............ | 379/93.01 |
| 6,771,971 B2 * | 8/2004 | Smith ........................ | 455/456.1 |
| 7,170,863 B1 * | 1/2007 | Denman et al. .............. | 370/260 |
| 7,194,637 B1 * | 3/2007 | Crawford ...................... | 713/153 |
| 7,356,832 B1 * | 4/2008 | Eibach et al. ..................... | 726/2 |
| 7,702,726 B1 * | 4/2010 | Grabelsky et al. ............ | 709/204 |
| 2002/0075844 A1 * | 6/2002 | Hagen ............................ | 370/351 |
| 2002/0103898 A1 | 8/2002 | Moyer et al. | |
| 2002/0126701 A1 * | 9/2002 | Requena ....................... | 370/469 |
| 2002/0131395 A1 | 9/2002 | Wang | |
| 2003/0026289 A1 * | 2/2003 | Mukherjee et al. ........... | 370/466 |
| 2003/0040280 A1 | 2/2003 | Koskelainen | |
| 2003/0041101 A1 * | 2/2003 | Hansche et al. ............... | 709/203 |
| 2003/0073440 A1 * | 4/2003 | Mukherjee et al. ........... | 455/435 |
| 2003/0101247 A1 * | 5/2003 | Kumbalimutt et al. ........ | 709/221 |
| 2003/0217099 A1 * | 11/2003 | Bobde et al. ................... | 709/202 |
| 2003/0217142 A1 * | 11/2003 | Bobde et al. ................... | 709/224 |
| 2004/0054672 A1 | 3/2004 | Tsuchitani et al. | |
| 2004/0059781 A1 * | 3/2004 | Yoakum et al. ................ | 709/204 |
| 2004/0098491 A1 * | 5/2004 | Costa-Requena et al. ..... | 709/229 |
| 2004/0103157 A1 * | 5/2004 | Requena et al. .............. | 709/206 |
| 2004/0260749 A1 | 12/2004 | Trossen et al. | |
| 2005/0170861 A1 | 8/2005 | Niemi et al. | |

FOREIGN PATENT DOCUMENTS

EP    1 588 236    10/2005

(Continued)

OTHER PUBLICATIONS

Bennett, et al, "Integrating Presence with Multi-Media Communications", dynamicsoft, 2000.*

(Continued)

*Primary Examiner* — Patrice Winder
*Assistant Examiner* — Julian Chang
(74) *Attorney, Agent, or Firm* — Harrington & Smith (57) ABSTRACT

Systems and methods are provided for providing access controlled event subscription and notification and event access change alerts. In some embodiments, the systems and methods of the present invention operate within a SIP infrastructure. As such, SIP SUBSCRIBE messages and SIP NOTIFY messages are used for subscribing to and receiving notifications related to access control. According to some embodiments, event access change alerts are used in conjunction with access controlled event subscription to provide an efficient method for providing access controlled event subscription using current access control information.

11 Claims, 6 Drawing Sheets

FOREIGN PATENT DOCUMENTS

| WO | WO 03/054717 A | 7/2003 |
|---|---|---|
| WO | WO 2004/063837 A | 7/2004 |
| WO | WO 2004/068265 A2 | 8/2004 |

OTHER PUBLICATIONS

Roach, "Session Initiation Protocol (SIP)—Specific Event Notification", 2002 The Internet Society.*
Roach, "SIP—Specific Event Notification", 2002, IETF.*
Roach, "SIP Specific Event Notification", Jun. 2002, RFC 3265.
Schulzrinne, "SIP Registration", Internet Enginering Task Force, Internet Draft, Expired Oct. 2001.
Rosenberg, "Requirements for Manipulation of Data Elements in SIMPLE Systems", Internet Draft, Oct. 2002.
Rosenberg, "A Session Initiation Protocol (SIP) Event Template—Package for Watcher Information", Internet Draft, May 2002.
Handley at al., "SDR: Session Description Protocol", RFC 2327, Apr. 1998.
Rosenberg et al, "SIP: Session Intiation Protocol", RFC 3261, Jun. 2002.
Rosenberg, "A Session Initiation Protocol (SIP) Event Package for Registrations", Internet Draft, Oct. 2002.
International Search Report dated Mar. 24, 2005.
Rosenberg, J., "A Presence Event Package for the Session Initiation Protocol (SIP)", IEFT Standard-Working-Draft, Internet Engineering Task Force, IEFT, Dec. 6, 2002.
European Office Action for corresponding EP Application No. 04 705 134.7-1244, Sep. 23, 2009, Europe.
Office action for related US Appl. No. 12/764,864 dated Oct. 12, 2010, pp. 1-35.
European Search Report for EP 04705134.7, 2007.
Anonymous: "Presence Service; Architecture and Functional Description" 3GPP TS 23.141 V6.1.0, Dec. 2002, pp. 1-31, XP002288176.
A Mechanism for Content Indirection in Session Initiation Protocol (SIP) Messages, Olson, SIP, Jun. 2, 2003, pp. 1-17.
A Presence Event Package for the Session Initiation Protocol (SIP), Rosenberg, SIMPLE WG, Jan. 31, 2003, pp. 1-24.
A Watcher Information Event Template-Package for the Session Initiation Protocol (SIP), Rosenberg, SIMPLE WG, Jan. 31, 2003, pp. 1-18.
International Search Report for corresponding PCT App. No. PCT/IB2005/001588 dated Sep. 21, 2005, pp. 1-5.
Ontology Library Systems: The key to successful Ontology Re-use, Ding et al., Division of Mathematics and Computer Science, Vrije Universiteit, Amsterdam, the Netherlands, 20 pages, 2007.
OWL Web Ontology Language Guide, Smith et al., W3C Recommendation, Feb. 10, 2004, pp. 1-57.
RFC 3680—A Session Initition Protocol (SIP) Event Package for Registrations, Rosenberg, Network Working Group, Mar. 2004, pp. 1-19.
Serendipitous Interoperability, Lassila, Nokia Research Center, Burlington, MA, pp. 1-9, 2002.
Simple Presence Publication Requirements, Campbell, et al., Nortel Networks, Inc., Feb. 11, 2003, pp. 1-10.

* cited by examiner

ACCESS RIGHT CONTROL USING ACCESS CONTROL ALERTS

FIELD OF THE INVENTION

This invention relates generally to telecommunications networks. More particularly, the invention concerns systems and methods for providing access right controlled event subscription, for providing access control alerts, and for controlling access rights using access control alerts.

BACKGROUND OF THE INVENTION

Event subscription and notification in network environments is becoming increasingly commonplace and important. Event subscription generally allows a first network entity to subscribe to event notifications from a second entity that may be related to a third network entity. Common examples of events include "presence" and "location;" however, the number and types of events are endless. For instance, conventional instant messaging services permit a first user to subscribe to a presence event for a second user. As such, during the period of the subscription, the first user receives updates as to the presence status (e.g., online or offline) of the second user. The subscription may be for a single inquiry, which will return a response of "present" or "not present" for the second user. The subscription may also be for a set period of time, which may result in multiple updates, or for other options (e.g., status change notifications, ongoing notifications, etc.)

Various protocols may be used for event subscription and notification. For example, the Session Initiation Protocol (SIP) may be used for such purposes. Although SIP is primarily a tool for initiating a communication session between endpoints, extensions to SIP have been proposed to provide event registration and trigger notification (see e.g., IETF document RFC 3265, "SIP-Specific Event Notification," July 2002). Such a proposal, however, neither specifies the semantics of specific events, nor systems and methods for uploading event information.

Access control in general has been a topic for research, standardization, and product development for several years. It marks a fundamental task for information processing in which the rights of involved parties are controlled for access to, and the use of, certain resources and information, such as files and events. With regard to event subscription and notification, access control is typically governed by the particular event package. For example, instant messaging services generally maintain common host or central administration schemes that use proprietary software and methods for implementing their particular service. As such, access control to an event (e.g., permission for subscribing to notifications for the presence of a second user listed on a first user's buddy list) may be unique for the particular service. Such proprietary solutions may be acceptable for subscription to only a few events; however, as the number of event types increase and become more complex, these may become problematic.

As an example of the problems with proprietary methods for providing access control and/or access alerts (e.g., alerts for changes in access, alerts for access requests, etc.), consider a scenario involving a cascaded set of event servers. Suppose that a first event server provides events related to sensor information, such as GPS coordinates, and that a second event server subscribes to this information from the first one. For instance, the second server may use GPS coordinates of certain users to derive other information, such as location information that is more coarsely grained (e.g., city information for the certain users). Suppose that the city location information is then used as input through another event subscription to other event servers. Handling of access control in this cascaded case through proprietary methods for each server (or for each event package) may be extremely inefficient and very complex to handle—particularly for a user who is concerned about the usage of this type of information (i.e., his location).

Providing a standardized interface for specifying and handling access rights for the same information (e.g., location information) to any node (e.g., servers, mobile devices, PC's) may be very advantageous. Further, integrating access control functionality into a generic solution may greatly reduce the complexity for involved entities, particularly when an entity subscribes to a variety of different events. A candidate protocol for such a generic solution may include the Session Initiation Protocol (SIP); however, other protocols may also be used.

In the context of SIP and access rights, watcher subscriptions are known in which an entity is able to subscribe to the watcher list of a particular event, and as such, will be notified when a new user wishes to subscribe to a particular event. With the use of watcher subscriptions, on-line authorizations of subscriptions are supported. For example, suppose an online music video service allows users to request access to the service from a host entity. If a first user requests access from the host entity, and if an authorization entity for the music video service has subscribed to a "watcher" event related to access to the music video service, the authorization entity will receive a notification ("watcherinfo") from the host entity. Otherwise stated, the authorization entity has subscribed to watcher information from the music video host entity.

The watcherinfo notification indicates that the first user desires access to the music video service and may include pertinent information, such as a URL for the first user. In order to change access rights for the first user (e.g., permit the first user to access the music video service), the authorization entity typically uses proprietary methods. In other words, watcher events themselves do not provide notifications of changes to access rights nor do they change access rights. They simply watch for access rights requests. As discussed previously, proprietary methods for changing access rights and/or providing notifications of such changes may be very inefficient and complex.

Thus, a need exists for systems and methods that provide access controlled event subscription using a common framework. Further, a need exists for systems and methods that provide access right change alerts using a common framework. Additionally, a need exists for systems and methods that provide access control for events through the use of access right change alerts using a common framework.

SUMMARY OF THE INVENTION

In order to overcome the above-described problems and other problems that will become apparent when reading this specification, the present invention provides systems and methods for providing access controlled event subscription using a common event framework. It further provides systems and methods for providing access right change alerts using a common event framework. The present invention also provides systems and methods for access right controlled event subscription using access right change alerts with a common event framework. Such systems and methods of the present invention may be used with a wide variety of protocols, systems, and entities.

In some embodiments, the systems and methods of the present invention operate within a SIP infrastructure and therefore use a SIP event framework. In other embodiments of the invention, computer-executable instructions for implementing the disclosed methods are stored on computer-readable media. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

Figure 1:
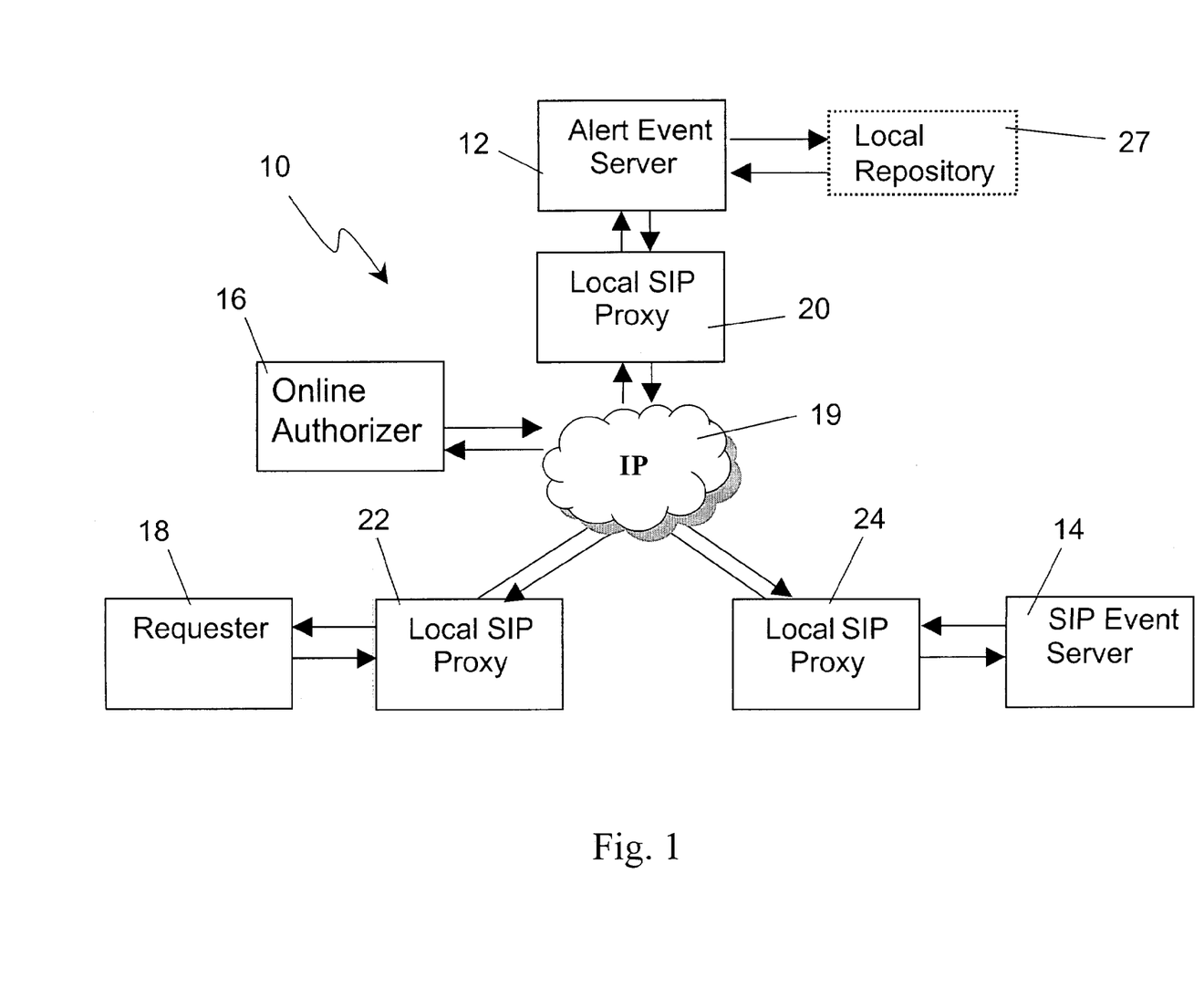
FIG. 1 shows an architecture that supports access control alerts and access controlled event subscription according to illustrative embodiments of the invention.

In the following description of the various embodiments, reference is made to the accompanying drawings that form a part hereof, and in which is shown by way of illustration various embodiments in which the invention may be practiced. It is to be understood that other embodiments may be utilized and structural and functional modifications may be made without departing from the scope of the present invention. Referring now to FIG. 1, a general architecture 10 is shown that supports event subscription and notification in a network environment, and in particular, that supports access controlled event subscription and access change notifications.

The access control discussed along with embodiments for architecture 10 may be applicable to almost any access control information model. For purposes of these embodiments, access rights are generally assumed to be defined for a set of users regarding particular resources. The access right information may be provided or updated in a variety of methods. For example, access right information may be provided through a provider policy or through the user directly. For instance, a user of an instant messaging service may upload a "buddy list" indicating entities to whom he desires to grant access to a "presence" event related to his availability status.

The resources associated with access rights may be, for instance, SIP events or file system resources. For SIP events, the access rights generally determine which SIP events for a particular URI might be accessed by certain other URIs. In other words, there may be a relation between SIP events, a SIP URI of the entity to which the current event belongs, and the set of URIs of entities that may be allowed to obtain the current event. As an example, suppose an event is the presence information of a SIP user used in conjunction with an instant messaging service. As such, a buddy list for the SIP user could be a set of URIs which are allowed to obtain the presence event. Other examples of SIP events may be location events or other sensor events. In another example, resources may be file system resources. For file system resources, the access rights may be related to a particular file or directory and the set of users may constitute a set that is allowed to access the file or directory. Additionally, the type of access (e.g., read, write, modify) might be associated with the particular access right.

As shown in FIG. 1, the architecture 10 generally includes an alert event server 12, a SIP event server 14, an online authorizer 16, a requester 18 and an IP communication network 19 through which these entities may communicate. Each one of these entities is in communication with a respective local SIP proxy 20, 22 and 24, which handles SIP messages and appropriately forwards them to the specified entity. Architecture 10 is generally shown to be part of a SIP event framework and therefore includes local SIP proxies 20, 22 and 24 for forwarding registration/subscription/notification messages according to IETF document RFC 3265, "SIP-Specific Event Notification," July 2002 (hereinafter "RFC 3265"); however, other forwarding mechanisms may be used that might not include local SIP proxies.

Requester 18 may be a mobile device or other device or entity that requests information, services, content or other data as part of an event request. SIP event server 14 and alert event server 12 may each be any device or entity, including a mobile device, that hosts event subscription and notification for an event, such as an access right alert event. In general, SIP event server 14 provides various type of events and alert event server 12 provides alert events related to access control. SIP event server 14 and alert event server may each be in communication with one or more local repositories 27, which may be linked to one or more access control systems (not shown). The access control systems host access rights for particular resources, events, users, files and other information.

Although shown as a one-to-one relationship, multiple local repositories 27 may respectively be in communication with SIP event server 14 or alert event server 12. Further, each local repository 27 may be in communication with multiple event servers. Further, event servers 12, 14 may be in communication with one or more online authorizers 16, which authorize event subscriptions as needed. For example, if requester 18 requests access to an event hosted by SIP event server 14 to which requester 18 does not have access, SIP event server 14 may send a message to online authorizer 16 requesting authorization. Various transport or application protocols may be appropriate for interacting with online authorizer 16, such as TCP or HTTP.

Architecture 10 provides a session initiation protocol (SIP) framework. As such, alert event server 12, SIP event server 14, and requester 18 are each registered with a corresponding local SIP proxy 20, 22 and 24, respectively. Although shown as separate logical entities, SIP event server 14 and/or SIP proxy 20 may be co-located. However, SIP event server 14 is generally an entity that is logically separate from a SIP proxy, and hosts event subscription and notification. Additionally, alert event server 12 along with its respective SIP proxy 20 and local repository 27, and requester 18 along with its respective SIP proxy 22, may be separate or co-located entities that perform their respective logically separate functions. Based on architecture 10, methods of access controlled event subscription and access change notifications according to embodiments of the present invention may be practiced.

Figure 2:
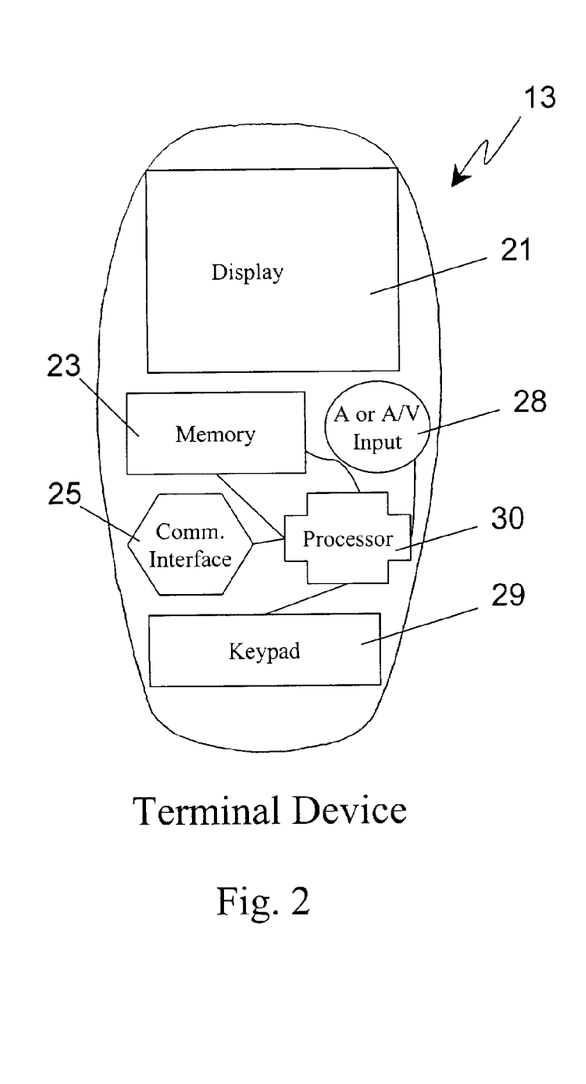
FIG. 2 shows a functional diagram of a mobile device that may act as the requester of FIG. 1.

Referring now to FIG. 2, a functional diagram of a mobile device 13 is shown that may act as a requester 18 or a SIP Event Server 14 according to embodiments of the invention, and that may even act as alert event server 12 or online authorizer 16. The mobile device 13 generally includes a processor 30 connected to a display 21, a memory 23, a communication interface 25, a keypad 29, and an audio or audio/visual input 28. Stored within the memory 23 are instructions for creating messages related to the present invention, such as SUBSCRIBE messages, which are described later. The mobile device 13 may comprise a mobile telephone, personal digital assistant (PDA), IP-enabled display device, or other electronic device.

Figure 3:
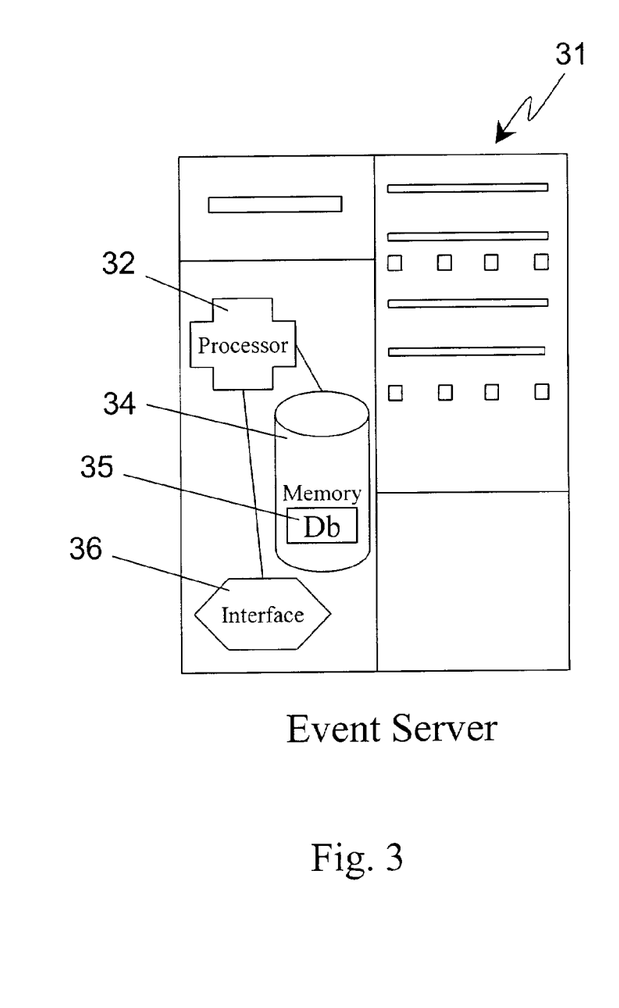
FIG. 3 shows a functional diagram of a server, which may be representative of the SIP event server, local repository, alert event server, or requester of FIG. 1.

Referring now to FIG. 3, a functional diagram of a server 31 is shown that may act as a requester 18, a SIP event server 14, a local repository 27, a SIP proxy, an alert event server 12, or an online authorizer 16. In some embodiments, a single server 31 may support multiple logically separate, but co-located, ones of these entities. Server 31 generally includes a processor 32 connected to memory 34 and interface 36. Memory 34 contains instructions for processor 32 to perform steps associated with event subscription and notification, access control for these events, or access change notifications. Further, as a local repository, the memory 34 of server 31 may store a database 35 containing access control information for devices or URIs. Additionally, as a SIP event server, memory 34 may store a local database 35 containing subscription information for devices or URIs.

According to one embodiment, architecture 10 provides a common framework through which access control change alerts may be provided. Using a SIP framework, such an architecture 10 takes advantage of existing functionality to provide such alerts. Thus, rather than leaving access control change alert mechanisms to proprietary systems or to specific event packages, a common scheme for these alerts is provided. This reduces complexity and simplifies operation when multiple event subscriptions are maintained. Further, such alerts may be used in conjunction with an access control system as discussed below along with FIGS. 6 and 7.

Suppose, as an example of access alerts, that a user (requester 18) subscribes to several instant messaging services and maintains several buddy lists for these services. Suppose further that the user subscribes to many different "presence" events for each of these other users. In order to accurately track the availability of other users, the user may desire to monitor the level of access he has to their presence information. As such, suppose that requester 18 subscribes to an "access control change" event for a particular other user (e.g., second user) on his buddy list for one of the instant messaging services. Suppose that the access control change event is hosted by a SIP event server, such as alert event server 12. Suppose also that another SIP event server, such as SIP event server 14, maintains the "presence" event for the second user. In another scenario, the presence event and the access control change event may be maintained by the same server. According to either scenario, requester 18 will receive alerts when his access to the second user's presence information changes while his subscription to such alerts is maintained. If the second user desires to remove or limit requester's 18 access to his presence information, requester 18 may be notified. Accordingly, requester 18 may accurately monitor his access level to the second user's presence information.

Figure 4:
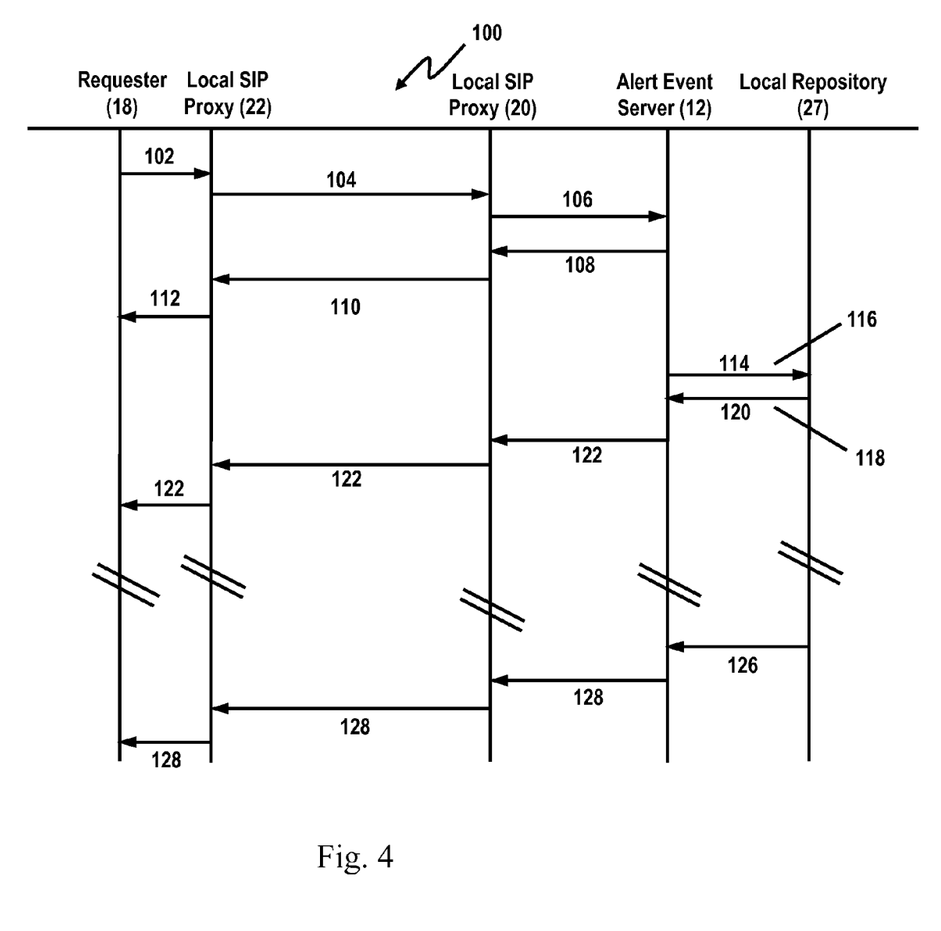
FIG. 4 shows message flows between entities of FIG. 1 for an access control alert method according to an illustrative embodiment of the invention.
Figure 5:
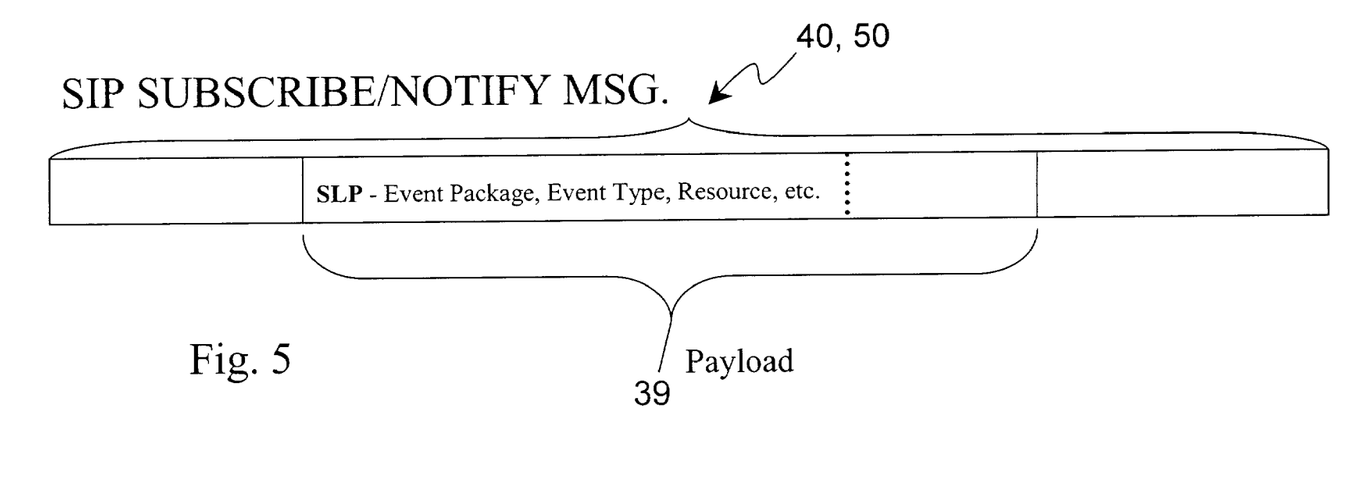
FIG. 5 shows a SIP SUBSCRIBE or SIP NOTIFY message according to the embodiments of FIGS. 4, 6 and/or 7.

Using architecture 10 as an example framework, message flows for a method 100 of subscription and notification of access control changes alerts according to an illustrative embodiment of the invention is shown in FIG. 4. As an overview, method 100 generally includes the following: requester 18 subscribing to a "changed" event with alert event server 12 using a SIP SUBSCRIBE message 40 (shown in FIG. 5), alert event server 12 performing a match for appropriate access right information, and alert event server 12 sending one or more NOTIFY messages back to requester 18 as necessary with appropriate access right information. The method 100 generally begins when requester 18 attempts to determine its access level to a particular event. As such, requester 18 sends a SUBSCRIBE message 40 to its corresponding local SIP proxy 22, which contains as a payload the description of the event package and event type for subscription. SUBSCRIBE message 40 may contain an "expires" parameter (not shown) indicating a duration of the subscription. Depending on the length of the subscription, device 18 may receive periodic notifications in response to changes for the event or may receive a one-time notification of his access control state to the desired event. SUBSCRIBE message 40 according to this embodiment may be a message that is part of an extension to SIP as defined in RFC 3265.

The format of the access right description in the payload may include, for example, attribute-based formats such as SLP or RDF-based formats, or a dedicated SIP description format. SUBSCRIBE message 40 is appropriately forwarded to the alert event server 12 via proxies 22 and 20. Upon reception of SUBSCRIBE message 40, alert event server 12 stores the subscription for the specified event (e.g., changed access rights) in local database 35 stored in memory 34 (shown in FIG. 3). The associated description and the expiration time for the subscription are also stored in local database 35.

Referring now to FIG. 4 in particular, and FIGS. 1-3 and 5 in general, message flows for method 100 of subscribing to an access control change event according to an embodiment of the invention will be described in more detail. As an example for use in describing these message flows, suppose that requester 18 desires to maintain accurate access state information for an entity listed in an instant messaging buddy list. Suppose further that alert event server 12 is a SIP event server that provides an access control event, and that SIP event server 14 is a SIP event server that provides various type of events, such as "presence" events. Accordingly, alert event server 12 hosts an event package compliant to IETF document RFC 3265, "SIP-Specific Event Notification," July 2002 named "access control." The "access control" event package provides access control to presence information for members of an instant messaging service. Within this event package, there is one event type defined, namely "changed," which is triggered when an access right has changed, such as for a specified buddy list member.

The event body contains information about the access rights of interest that may change, i.e., information about the resource and its associated access information that may change (e.g., buddy list name, presence state). Note that the naming for the package as well as the event are only illustrative. It is possible, however, to define a common event package template for handling access right alerts for each event package individually (e.g., a standard message format compliant with RFC 3265 for an event type named "changed" for "access control" events).

As shown in FIG. 4, in order to subscribe to the event "changed" of the event package "access control", requester 18 sends 102 a SUBSCRIBE message 40 (shown in FIG. 5) to its local SIP proxy 22, which contains as a payload 39 the event package (e.g., access control) and event type (e.g., changed) to subscribe to. Further, it contains appropriate information about the resource whose access rights are supposed to be monitored (presence information for a buddy list name). Note that the format of the resource information and the access rights may be defined in various ways. For example, attribute-based formats such as used in SLP or RDF-based formats are candidates for this part of the invention.

The SUBSCRIBE message 40 is appropriately forwarded 104 to the local SIP proxy 20 for alert event server 12, and then forwarded 106 to alert event server 12. Upon reception of SUBSCRIBE message 40, alert event server 12 stores the subscription and the associated resource/access rights information in its local database 35 (shown in FIG. 3) with the associated expiration time given in the subscription. Compliant to the "SIP-Specific Event Notification" document RFC 3265, SUBSCRIBE message 40 is appropriately confirmed, e.g., with a '200 OK', to requester 18, which is shown as messages 108, 110, and 112.

This confirmation takes into account whether requester 18 is actually authorized to obtain the requested access right information. For instance, if requester 18 is not on the resource's buddy list, or is not the resource owner, then he is probably not a candidate for obtaining information about access right changes for the presence of this instant messaging resource beyond the mere information that the access right does not exist for him. The problem of appropriately filtering the information to be provided depends on the specific access right information model. As detailed herein, however, the invention assumes that an appropriate policy for information selection is provided at alert event server 12.

After confirming the SUBSCRIBE message, alert event server 12 sends 114 a match message 116 to the associated local repository 27 for performing a match with the registered access rights stored in repository 27. Note that an appropriate mapping of the access rights description format for the match message 116 may be necessary. Attribute-based formats such as used in SLP or RDF-based formats are candidates for the access rights description format; however, a dedicated format might be used.

Note also that if there are several local repositories, mapping of SUBSCRIBE message 40 may be necessary to identify the appropriate repository for receiving match message 116. For example, a repository identifier may be included in SUBSCRIBE message 40. Alert event server 12 may further determine the appropriate local repository 27 based on the access right description given in SUBSCRIBE message 40. This may be particularly true if the repository represents an access control repository of a particular technology. Further, alert event server 12 may determine the appropriate repository implicitly, such as through recognition of the format in SUBSCRIBE message 40 (e.g., SLP, RDF) and making a decision based thereon. Additionally, alert event server 12 may query the access rights with all associated local repositories by sending 114 appropriate match messages 116 to all associated repositories or agents. If the repository functionality is co-located with alert event server 12, match message 116 might not need to be sent. If several requests have been sent to several associated repositories 27, alert event server 40 preferably waits for responses 118 from all of these repositories.

After the reception 120 of repository responses 118, alert event server 12 appropriately filters the obtained information with respect to the subscribed user (i.e., requester 18), by applying a selection policy. The event server 12 then sends 122 a NOTIFY message 50 (shown in FIG. 5) back to requester 18. Message 50 contains the resource description (i.e., "presence" for the buddy list resource) plus associated access right information (e.g., access permitted) and the triggered event (e.g., changed) in an appropriate format (e.g., SLP). If there was not a match for the specific resource, the payload 39 contains an appropriate indication. The NOTIFY message 50 is appropriately routed through the SIP proxies 22, 20 to requester 18.

Note that the invention allows for a plain query of access rights. Suppose as an example that when requester 18 subscribes (i.e., steps 102, 104 and 106 in FIG. 4) to a changed event, the body of SUBSCRIBE message 40 specifies an expiration time of zero for the subscription. In this case, the subscription is not stored in local database 35. As such, only the information lookup with repository 27 (i.e., steps 114 and 120 shown in FIG. 4) are performed, which leads to an appropriate NOTIFY message 50 being sent to requester 18 (i.e., step 122 shown in FIG. 4).

If the subscription associated with SUBSCRIBE message 40 of FIG. 4 has not been a one-shot subscription (i.e., a non-zero expiration time has been given in message 40), alert event server 12 follows up with subsequent NOTIFY messages at appropriate times. For example, at pre-determined intervals or in response to changes to access control rights, local repository might notify 126 alert event server 12 of current access control rights. Upon reception of such an update, alert event server 12 performs appropriate matching functions by comparing the notified access control changes with subscriptions stored in database 35 (shown in FIG. 3). Note that such updates from local repository 27 may be unnecessary if repository 27 and alert event server 12 are co-located.

After comparing the update with stored subscriptions, alert event server 12 applies its local policies for filtering the information with respect to the authorization for obtaining these changes, and sends 128 appropriate NOTIFY messages to currently subscribed requesters, such as requester 18. These messages are appropriately routed through SIP proxies 20, 22 to the requester 18. As such, requester 18 is subsequently notified of changed access control information, which is given as payload 39 in the body of NOTIFY message 50 (shown in FIG. 5). If a stored subscription with alert event server 12 expires based on the expiration time given in SUBSCRIBE message 40, alert event server 12 removes the appropriate subscription from its local database 35 (shown in FIG. 3).

Method 100 shown in FIG. 4 is applicable to a wide range of events and circumstances. As discussed, it may be advantageous in stand-alone scenarios, such as providing access rights directly to an end user (e.g., updates buddy list information to a instant messenger). In other scenarios, such as a cascaded server scenario, method 100 may provide advantages in combination with other events and other methods. As an example discussed along with FIG. 7, method 100 may be used to provide change alerts to an entity that provides access controlled event subscription.

Referring to FIG. 1 along with FIGS. 2-3 and 5-6, a system and method 200 for providing access controlled event subscription is shown according to an embodiment of the invention. This embodiment takes advantage of a common framework, such as a SIP event framework. Methods for access controlled event subscription using a common framework, such as SIP, can provide many advantages. For example, rather than requiring specific access right methods to be implemented in each entity hosting access rights, a method that takes advantage of a common framework, such as a SIP framework, may be almost universally applicable. Further, such an access control method may apply to a wide variety of events, in contrast to templates that are targeted to specific events or a script that applies to a specific event server.

As an example of a method for providing access control to events, suppose that a mobile device (not shown) provides context information to SIP event server 14. For instance, suppose the mobile device constantly provides its current location information using GPS coordinates. Suppose further that the user of the mobile device has joined multiple services that provide information, content and/or services based on the current location information of the mobile device. For instance, the user may have joined an emergency roadside service, a local news service, a tracking service through which a friend may monitor his location, a geographical map service that provides street maps for his present location, etc. As such, a variety of entities may need to subscribe to location information for the user's mobile device. The user, however, might not desire to permit all of these entities to have continual access to his location information. As such, the user may desire to change access rights as needed for these entities. According to method 200 for access right event subscription, these entities may subscribe to SIP event server 14 for receiving the user's location information automatically based on the current state of access rights set by the user. According to such an embodiment, the user may interact with alert event server 12 to change access rights for events, such as those related to his location information.

SIP event server 14 according to such an example maintains the location information for the user's mobile device. In accordance with such an embodiment, SIP event server 14 implements a cache of access rights for a "location" event as well as other applicable events. The cache may be stored as part of database 35 shown in FIG. 3. The cache stored in database 35 preferably includes the event type for which the access rights are defined, a list of users having access rights, and additional information. The list of users may be in the form of a URI list, which identifies the users that are allowed to subscribe (named "white list" in this embodiment) or those that are not allowed to subscribe (named "black list" in this embodiment). The additional information includes information that may be necessary to further characterize the subscription. For instance, the URI of the mobile device may be maintained in the present example as additional information used for properly identifying the device.

Figure 6:
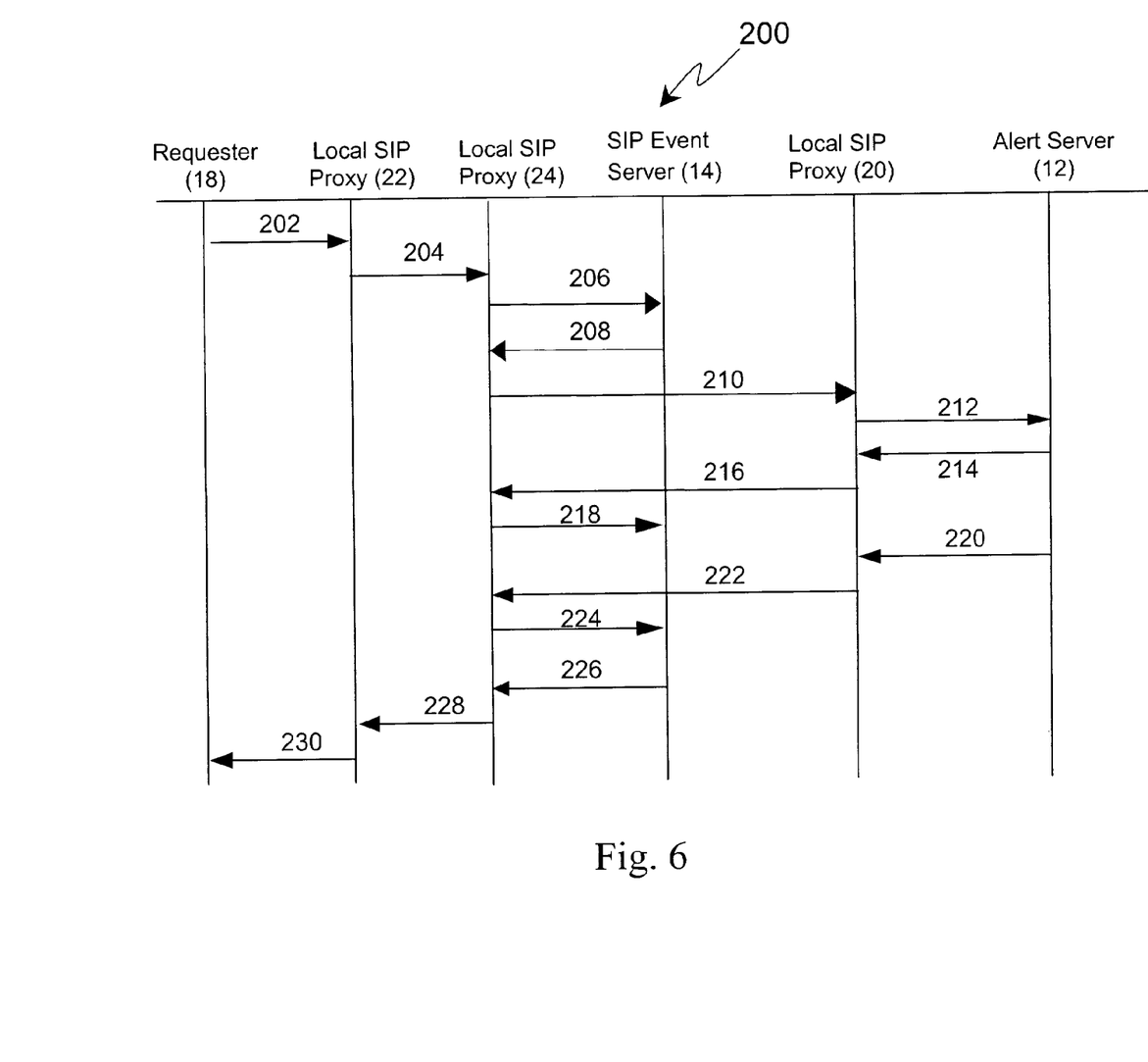
FIG. 6 shows message flows between entities of FIG. 1 for a method of access controlled event subscription according to an illustrative embodiment of the invention.

Using architecture 10 (shown in FIG. 1) as an example framework, a method 200 for providing access right controlled event subscription and notification according to an embodiment of the invention is shown in FIG. 6. According to such an embodiment, access to an event (e.g., subscription) is provided based on current access rights. As shown in FIG. 6, a requester 18 may attempt to subscribe to an event (e.g., location of the mobile device) by sending 202 a SUBSCRIBE message 40 (shown in FIG. 4) to its local SIP proxy 22, which contains as a payload 39 the event package and type for subscription (e.g., location). As with SUBSCRIBE messages 40 discussed previously in other embodiments, based on the particular SIP event package, various formats may be used for the subscription information plus any additional information that might be required to further identify the subscription. For example, attribute-based formats such as SLP or RDF based formats may be appropriate formats.

The SUBSCRIBE message 40 is appropriately forwarded 204, 206 to the SIP event server 14. Upon reception of the SUBSCRIBE message 40, SIP event server 14 performs a query on its local cache stored in database 35 (shown in FIG. 3) to obtain the access rights for this particular event (e.g., location). For this query, the event server might use additional information, such as the URI of the user to which the event 'belongs'.

The query's return may be categorized as "access denied," "access allowed," "access unclear," or "no access rights." Access denied may be returned if requester 18 is not included on the white list or if requester 18 is on the black list. Access allowed may be returned if requester 18 is included on the white list. Access unclear may be returned whenever there is a conflict, such as when requester 18 is on both lists. No access rights may be returned when there is no access information for requester 18, such as for an initial subscription. When SIP event server determines that access is denied for requester 18, it sends 226, 228 and 230, an appropriate NOTIFY message 50 to requester 18.

For situations where access is allowed, access is unclear, or there are no access rights, message flows 208-224 are executed. Note that even if the cache indicates positive access rights for the particular subscription, the current access rights are retrieved from the alert server. This is done to avoid concurrency situations in which the access rights at the alert server have already been changed, but the appropriate NOTIFY message 50 has not yet been arrived at SIP event server 14 to reflect the update. In such situations, the subscription could be granted based on stale information.

To avoid these situations, SIP event server 14 sends, via steps 208, 210 and 212 (SIP proxy routing), a SUBSCRIBE message 50 requesting updated access rights for the particular event (e.g., location for the user's mobile device) to alert server 12. This may done as a one-time subscription based on specifying an expiration time of zero in the SUBSCRIBE message 40. The SIP event server 14 may obtain the URI of alert server 12 for the particular subscription through various means. For example, this URI might be determined using a common naming scheme, e.g., username@access_control.domain, or the URI might be defined when providing the actual event information, such as during registration of the actual information source with the event server. In the mobile device location scenario, the mobile device may provide the URI for alert server 12 during initial registration with SIP event server 14.

Upon reception of the SUBSCRIBE message 40 requesting updated access information for the requested event (e.g., access information for event "location" of the mobile device), alert server 12 confirms the subscription appropriately by sending confirmation messages in steps 214, 216 and 218. If this confirmation is negative, e.g., the wrong alert server URI has been provided or the alert server does not support the requested access rights, SIP event server 14 denies the received subscription from requester 18 with an appropriate NOTIFY message 50 as shown in steps 226, 228 and 230. If the alert server subscription sent in step 212 is successful (e.g., correct alert server), a positive confirmation is sent in steps 214, 216 and 218, which is followed up with an appropriate NOTIFY message 50 sent in steps 220, 222 and 224 by alert server 12 to SIP event server 14. NOTIFY message 50 contains the current access rights for the requested event (e.g., location). SIP event server 14 in turn waits for this NOTIFY message 50 (based on receiving a confirmation message in step 218) and stores the current access right information in the cache of database 35. The SIP event server 14 then decides whether to grant the original subscription based on the updated cache information.

If the updated cache indicates access denied, a negative confirmation is sent back to the requester in steps 226, 228 and 230. If the cache indicates access allowed, a positive confirmation, i.e., '200 OK', is sent back to the requester in steps 226, 228 and 230. If the cache indicates access unclear, event server 14 distinguishes two different sub-cases: on-line authorization and access denied. On-line authorization provides an optional feature of the present invention in compliance with event template packages for watcher information. If there exists an Online Authorizer relationship for this particular subscription, event server 14 sends an appropriate message (not shown) to OnlineAuthorizer 16 to ask for subscription permission. The OnlineAuthorizer 16 sends back an appropriate confirmation (not shown) that indicates whether to grant the original submission. In such an embodiment, SIP event server 14 may support the watcherinfo template, and the OnlineAuthorizer 16 might have a subscription to the watcherinfo for the particular event. In this case, SIP event server 14 sends an appropriate watcherinfo NOTIFY message 50 to the OnlineAuthorizer 16, which in turn sends back a message to the SIP event server 14 that contains information whether or not to grant the original subscription.

When access is denied based on unclear access rights, SIP event server 14 denies the original subscription and thereby sends a negative confirmation to requester 18 in steps 226, 228 and 230. If the updated cache stored in database 35 indicates that access is denied, it is treated as if the requester's identity were not listed on the white list or that the white list is empty. Note that the denied subscription from requester 18, or an accepted subscription, may have follow-up actions, such as those defined IETF's document RFC 3265, SIP-Specific Event Notification, July 2002.

Figure 7:
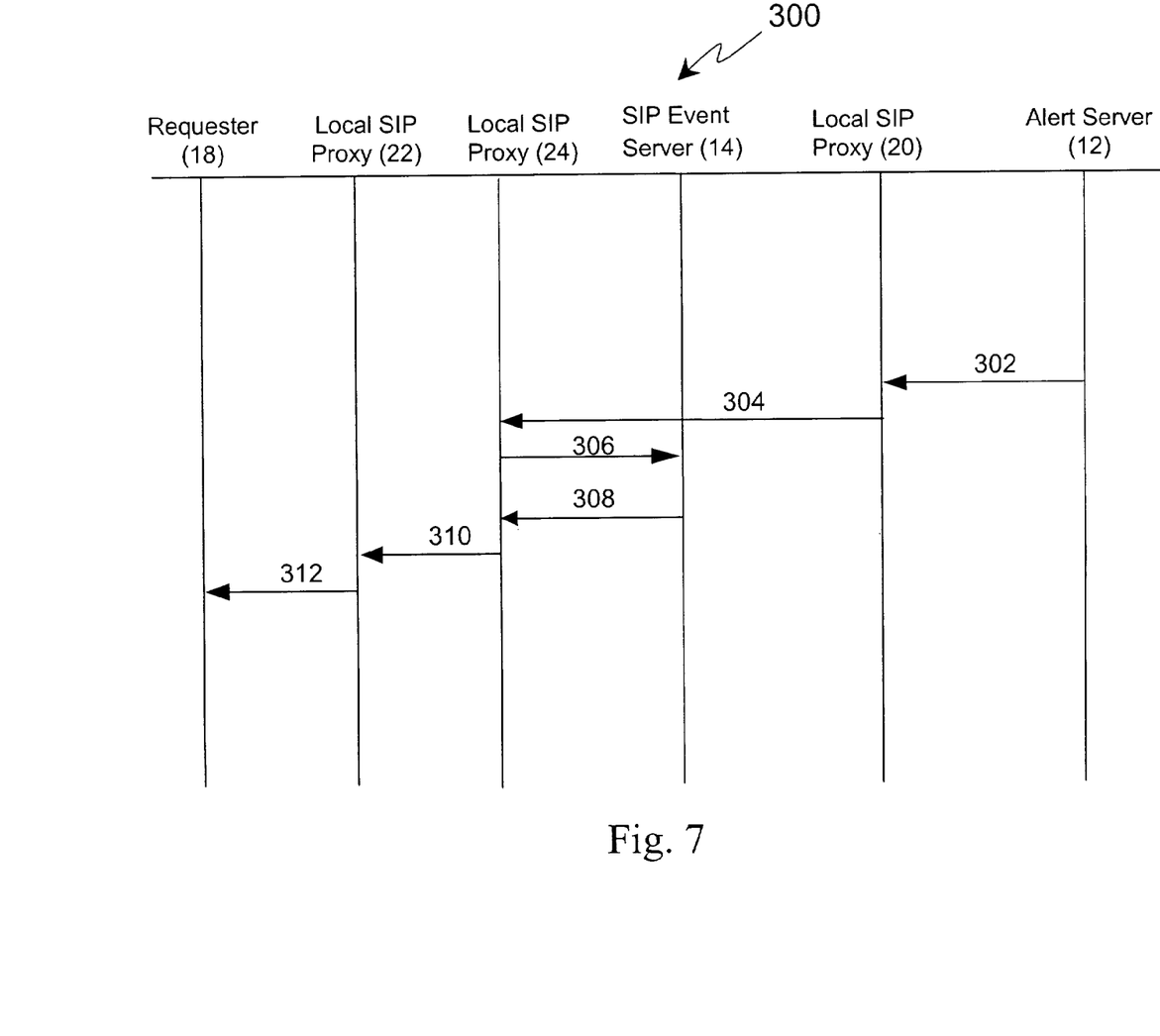
FIG. 7 shows message flows between entities of FIG. 1 for methods of access rights change notification according to another illustrative embodiment of the invention.

Referring now to FIG. 7 along with FIGS. 1-6, a method 300 is shown that represents another embodiment of the present invention. Method 300 is generally a variation of method 200 and includes many aspects and preferences of method 200, except for those related to access right change updates. Method 300 generally includes a system and method for providing access right controlled event subscription using access right change alerts. In other words, SIP event server 14 according to method 300 may take advantage of access right change subscription method 100 discussed along with FIG. 4 in order to automatically receive access right updates. As such, the method 200 for access right controlled subscription discussed along with FIG. 6 may be improved via combination with method 100 in a further embodiment of the invention. This is because it is likely that access rights will change over time at alert server 12 during existing subscriptions at SIP event server 14. In keeping with the location event scenario, this may be particularly true as the user of the mobile device travels and changes access rights based on his needs at his present location.

The handling of these updates and changes is shown generally in FIG. 7. Since there already exists a subscription at event server 14 for a particular event (e.g., location), there also exists a subscription to the access right alert event at alert server 12 for the particular event as part of method 200 discussed along with FIG. 6. Hence, alert event server 12 sends 302 an access right change alert NOTIFY message to SIP event server 14 via steps 304 and 306 in response to an access right change. Upon reception of the alert (NOTIFY) message, event server 14 updates its local cache entry for the event for which the access right changed based on information for the event included in the alert event message sent in step 302.

Further, event server 14 checks existing subscriptions and filters those subscriptions that are affected by the received changes/updates. The check of these filtered subscriptions against the changes in access rights may lead to either verification or revocation of the requester's access rights to the event (e.g., location information). Revocation of requester's 18 access rights may occur if the updated/changed access rights indicate that requester 18 is no longer allowed to have access to the particular event, such as location information for the mobile device (not shown). This could be checked through the black list (i.e., requester is now in this list) or through the white list (i.e., the user is no longer in this list). As a consequence, SIP event server 14 deletes requester's subscription from its internal database and sends 308 a NOTIFY message 50 to the requester via steps 310 and 312. In the case that requester 18 is no longer in the white list in comparison with updated/changed access rights, but has not explicitly been excluded from the access rights (through adding to the black list), SIP event server 14 may use the OnlineAuthorizer 16 as discussed above to verify subscription rights online.

While the present invention has been described in connection with the illustrated embodiments, it will appreciated and understood that modifications may be made without departing from the true spirit and scope of the invention. In particular, the invention applies to other session related protocols, to various discovery mechanisms and protocols, and to a variety of different devices and networks. Further, the present invention is applicable to a wide range of events and entities.

We claim:

1. A method comprising:
   receiving from a requester a subscribe message for an event for a resource, the requestor being a different entity than the resource;
   querying a database containing access control information for said event;
   when said access control information does not indicate denial of access to said event, accessing updated access control information via a repository; and
   notifying said requester of access status for said events based on said updated access control information;
   wherein the accessing of updated access control information comprises sending the subscribe message to an access control network entity requesting updated access control information for said event and receiving updated access control information for said event in order to avoid notifying the requester of access status for the event that is based on stale information obtained by querying the database.

2. The method of claim 1, wherein the accessing of updated access control information comprises:
   subscribing to an access rights change alert event for access rights of said event; and while said subscription is in effect, accessing the last received access control information received from said network entity for said event.

3. The method of claim 1, wherein said subscribe message comprises a session initiation protocol subscribe message.

4. The method of claim 1, wherein said database is stored on a local cache.

5. The method of claim 1, further comprising receiving from the access control network entity updated access control without a user's action when the access control is changed.

6. The method of claim 1, wherein the access control network entity is a server.

7. An apparatus comprising:
   at least one processor; and
   at least one memory including computer program code for one or more programs,
   the at least one memory and the computer program code configured to with the at least one processor, cause the apparatus to perform at least the following,
   receive from a requester a subscribe message for an event for the resource, the requestor being a different entity than the resource;
   query a database containing access control information for said event;
   when said access control information does not indicate denial of access to said event, access updated access control information via a repository; and
   notify said requester of access status for said event based on said updated access control information;

wherein the access of updated access control information comprises sending the subscribe message to an access control network entity requesting updated access control information for said event, and receiving updated access control information for said event in order to avoid notifying the requester of access status for the event subscription that is based on stale information obtained by querying the database.

8. The apparatus of claim 7, wherein the accessing of updated access control information comprises further causing the apparatus to:
   determine to send the subscribe message to an access control network entity requesting updated access control information for said event; and
   determine to receive updated access control information for said event.

9. The apparatus of claim 7, wherein the accessing of updated access control information comprises further causing the apparatus to:
   subscribe to an access rights change alert event for access rights of said event; and while said subscription is in effect, access the last received access control information received from said apparatus for said event.

10. A non-transitory computer-readable storage medium carrying one or more sequences of one or more instructions which, when executed by one or more processors, cause an apparatus to at least perform the following steps:
   receiving from a requester a subscribe message for an event for a resource, the requestor being a different entity than the resource;
   querying a database containing access control information for said event;
   when said access control information does not indicate denial of access to said event, accessing updated access control information via a repository; and
   notifying said requester of access status for said event based on said updated access control information;
   wherein the accessing of updated access control information comprises sending the subscribe message to an access control network entity requesting updated access control information for said event, and receiving updated access control information for said event in order to avoid notifying the requester of access status for the event that is based on stale information obtained by querying the database.

11. The non-transitory computer-readable storage medium of claim 10, wherein the accessing of updated access control information comprises:
   subscribing to an access rights change alert event for access rights of said event; and while said subscription is in effect, accessing the last received access control information received from said network entity for said event.

* * * * *